(12) United States Patent
Rozman et al.

(10) Patent No.: US 8,581,425 B2
(45) Date of Patent: Nov. 12, 2013

(54) SYSTEMS AND METHODS INVOLVING ELECTRICAL START AND POWER GENERATION

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 488 days.

(21) Appl. No.: 12/910,221

(22) Filed: Oct. 22, 2010

(65) Prior Publication Data

US 2012/0098261 A1 Apr. 26, 2012

(51) Int. Cl.
*H02P 9/00* (2006.01)

(52) U.S. Cl.
USPC .............. 290/1 A; 290/40 B; 322/14

(58) Field of Classification Search
USPC .............. 290/1 A, 8, 40 B; 322/10, 14
See application file for complete search history.

(56) References Cited

U.S. PATENT DOCUMENTS

| | | | |
|---|---|---|---|
| 5,015,941 A | | 5/1991 | Dhyanchand |
| 5,325,042 A | | 6/1994 | Murugan |
| 5,363,032 A | * | 11/1994 | Hanson et al. ............ 322/10 |
| 5,546,742 A | | 8/1996 | Shekhawat et al. |
| 5,587,647 A | | 12/1996 | Bansal et al. |
| 5,594,322 A | * | 1/1997 | Rozman et al. ............ 322/10 |
| 5,929,537 A | | 7/1999 | Glennon |
| 6,812,586 B2 | | 11/2004 | Wacknov et al. |
| 7,112,944 B1 | | 9/2006 | Kojori |
| 7,239,034 B2 | * | 7/2007 | Gehret, Jr. ............ 290/40 B |
| 7,258,183 B2 | | 8/2007 | Leonardi et al. |
| 8,358,111 B2 | | 1/2013 | Rozman et al. |
| 2007/0222220 A1 | | 9/2007 | Huang et al. |
| 2008/0111420 A1 | | 5/2008 | Anghel et al. |

FOREIGN PATENT DOCUMENTS

| | | |
|---|---|---|
| DE | 102007024567 A1 | 11/2008 |
| EP | 2341608 A1 | 7/2011 |
| FR | 2959279 A1 | 10/2011 |
| WO | 2008145212 A1 | 12/2008 |

OTHER PUBLICATIONS

European Search Report dated Jun. 29, 2012 for Application No. 11189742.7-1242.

* cited by examiner

*Primary Examiner* — Nicholas Ponomarenko
(74) *Attorney, Agent, or Firm* — Cantor Colburn LLP

(57) ABSTRACT

A power generation system includes a prime mover, a generator mechanically connected to the prime mover, the generator including a field winding portion and an armature winding portion, a direct current bus node, a first variable frequency drive having an input electrically connected to the bus node and an output electrically connected to the armature winding portion, and an inverter having an input electrically connected to the bus node and an output electrically connected to the field winding portion.

20 Claims, 3 Drawing Sheets

SYSTEMS AND METHODS INVOLVING ELECTRICAL START AND POWER GENERATION

BACKGROUND OF THE INVENTION

The subject matter disclosed herein relates to systems and methods involving power generation in vehicles.

Many vehicles including, for example, commercial and military vehicles may include an electrical generator system that powers a variety of equipment including native equipment such as motors or electronics; and other external equipment that may be connected to the system. Typically the electrical generator system is powered by a prime mover that may use combustion to mechanically drive the generator.

BRIEF DESCRIPTION OF THE INVENTION

According to one aspect of the invention, a power generation system includes a prime mover, a generator mechanically connected to the prime mover, the generator including a field winding portion and an armature winding portion, a direct current bus node, a first variable frequency drive having an input electrically connected to the bus node and an output electrically connected to the armature winding portion, and an inverter having an input electrically connected to the bus node and an output electrically connected to the field winding portion.

According to another aspect of the invention, a method for starting a generator system includes outputting direct current from a direct current source to an inverter, inverting the direct current in to alternating current and outputting the alternating current to a field winding portion of a generator, outputting direct current from the direct current source to a variable frequency driver, inverting the direct current in to alternating current and outputting the alternating current from the variable frequency driver to an armature winding portion of the generator, rotating the generator to drive a prime mover, the prime mover mechanically connected to the generator, and starting the prime mover.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
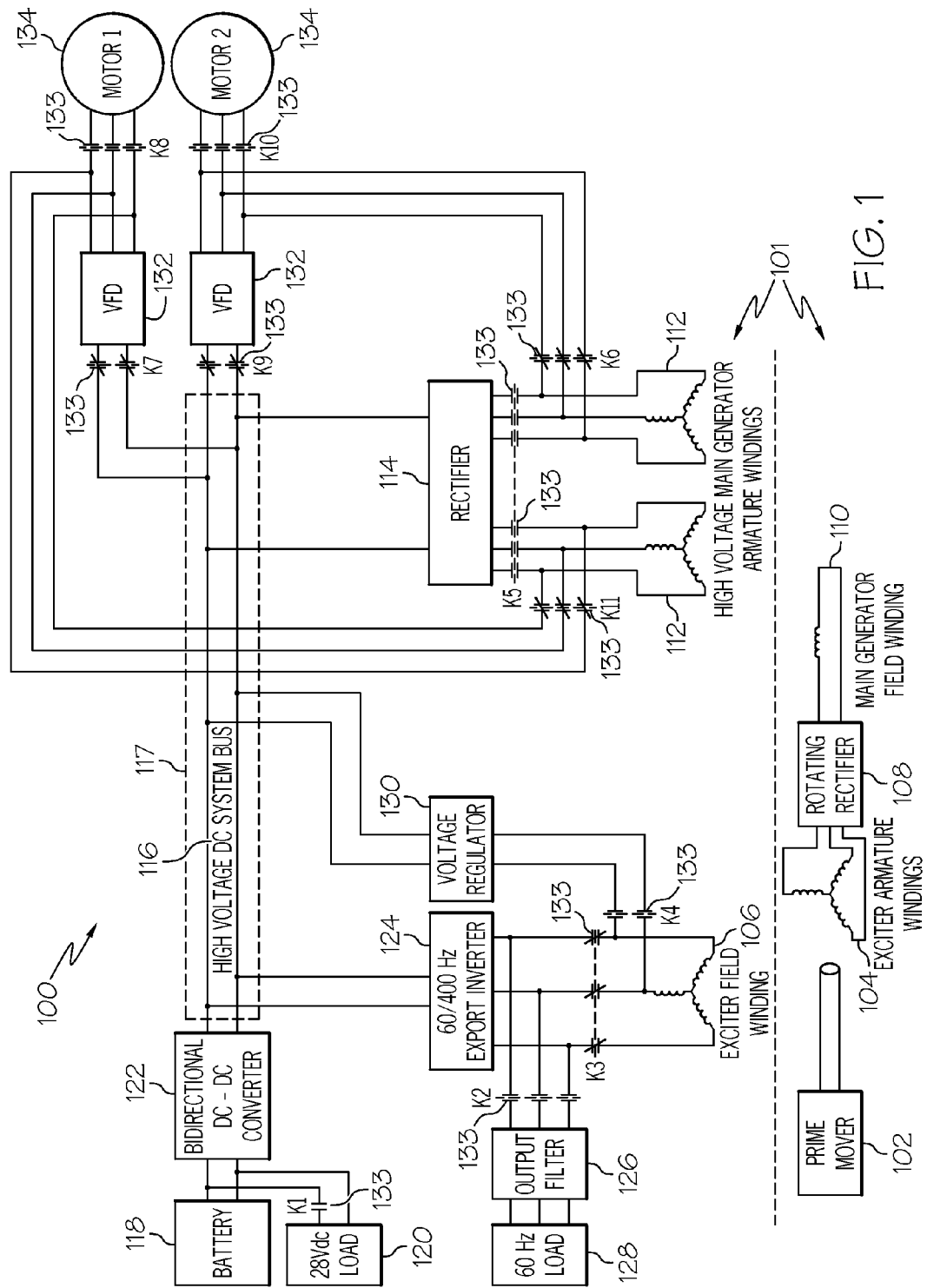
FIG. 1 illustrates a block diagram of an exemplary embodiment of a system.

FIG. 1 illustrates a block diagram of an exemplary embodiment of a system 100. The system 100 includes a prime mover 102 mechanically connected to a generator 101 having an exciter portion that includes exciter armature windings 104 and exciter field windings 106; a rotating rectifier portion 108; and a main generator portion that includes main generator field winding 110 and main generator armature windings 112. The prime mover 102 may include any suitable machine such as, for example, an internal combustion engine or gas-turbine engine. The illustrated embodiment includes two main generator armature windings 112 that are electrically connected to a rectifier 114. The use of two main generator armature windings 112 allows the use of a 12-pulse type of rectifier 114. Alternate embodiments may include, for example, a single set of main generator armature windings 112 that are connected to a 6-pulse type of rectifier 114.

The system 100 includes a direct current (dc) system bus (dc bus) 116 that includes a bus node 117. A battery 118 and a dc load 120 are connected to the dc bus 116 via a bidirectional DC-DC converter 122 that converts dc voltages to higher or lower dc voltages. A programmable export inverter 124 is connected to the dc bus 116 and is operative to convert dc power from the bus into alternating current ac. In the illustrated example, the programmable export inverter 124 may output 60 Hz or 400 Hz power. In this regard, the 60 Hz power may be output via a filter 126 to a 60 Hz load 128 during system run modes, while 400 Hz power may be output to the exciter field winding 106 during system starting modes. A voltage regulator 130 is connected to the dc bus 116 and provides power to the exciter field winding 106 during system run modes. A pair of variable frequency drivers (VFD) 132 are connected to the dc bus 116, and are operative to drive respective traction motors 134 by inverting the dc power from the bus to a three-phase ac output to the traction motors 134. The three-phase ac output from the VFDs 132 may also be output to the respective phases of the main generator armature windings 112. A plurality of contacts or switching devices (K1-K11) 133 are arranged in the system 100 to allow the transition of the system from a starting mode to a run mode.

The system 100 (and 300 described below) allow for a system to operate in a start configuration and run configuration with a reduced number of components by utilizing multi-functional equipment. For example, the use of an export inverter to provide 400 Hz excitation power to the wound field synchronous generator (WFSG) during start mode, and 60 Hz ac power during generate (run) mode. The use of the VFDs 132 to drive the generator 101 and start the prime mover 102 (as opposed to including an additional VFD that is operative to only drive the generator) reduces the number of VFDs in the system. While, the use of the programmable export inverter 124 allows a single inverter unit to provide excitation current (at a higher frequency) to the exciter field winding 106 during start configuration and 60 Hz power to a 60 Hz load 128 during run operations.

FIG. 1 illustrates the system 100 with the contacts 133 aligned in a start mode configuration. In this regard, in a starting configuration, the contacts K1, K2, K4, K5, K8 and K10 are open, and the contacts K3, K6, K7, K9, and K11 are closed. Thus, in start mode, the battery 118 outputs low voltage dc (e.g., 24 Vdc) to the bidirectional DC-DC converter 122 that converts the low voltage dc into high voltage dc (e.g., 300-800 Vdc) that powers the dc bus 116. The programmable export inverter 124 receives dc power from the dc bus 116 and inverts the dc power to output ac power (e.g., 400 Hz) to the exciter field winding 106. The VFDs 132 receive dc power from the dc bus 116 and output ac power to the main generator armature windings 112. The VFDs 132 drive the main generator field winding 110 and the exciter armature windings 104 that are mechanically connected to the prime mover 102. The rotation of the prime mover 102 allows the prime mover 102 to start. Once the prime mover 102 has started and has accelerated to exceed a lower operating speed threshold, the system 100 may be aligned to enter a run mode of operation.

Figure 2:
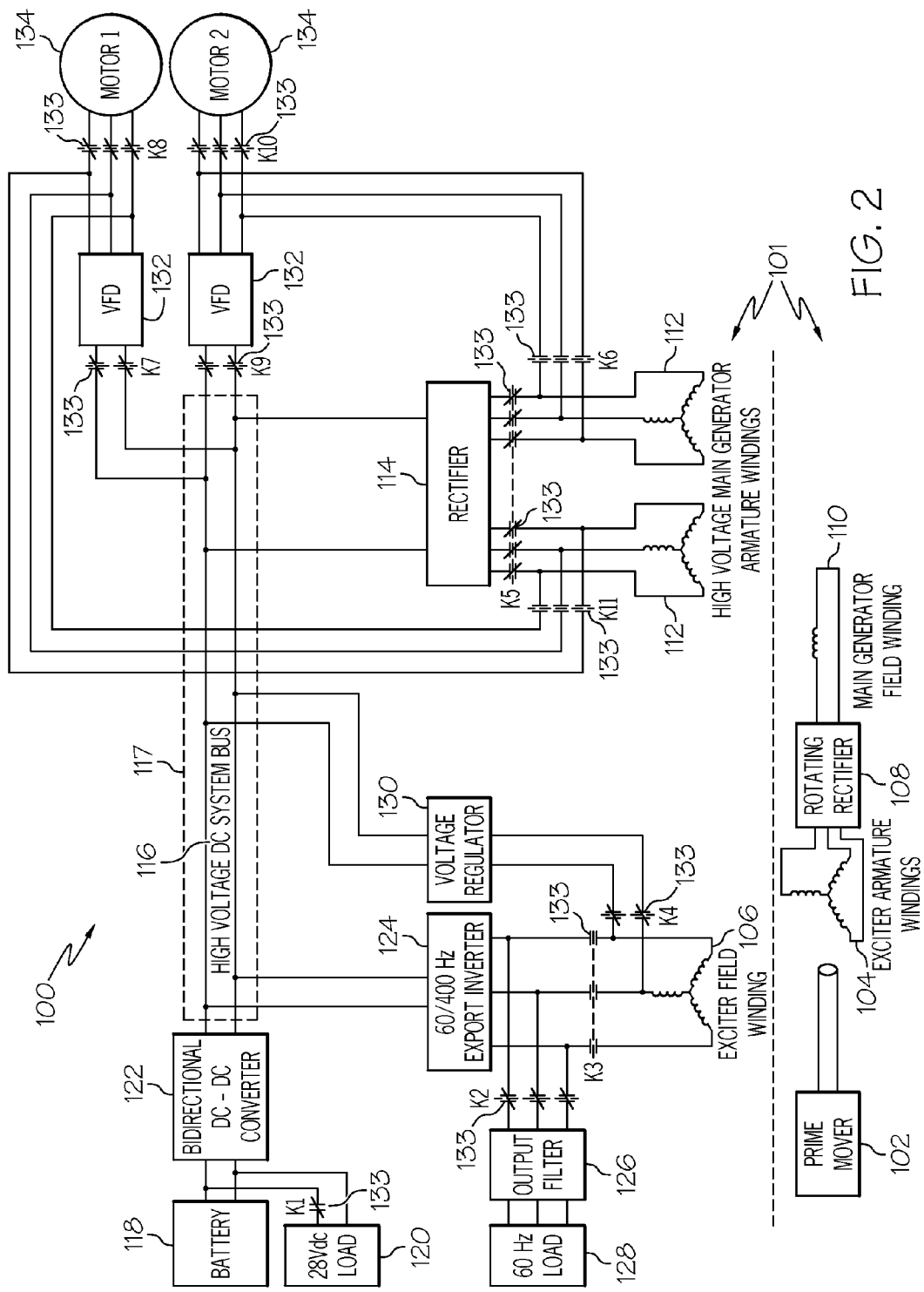
FIG. 2 illustrates a block diagram of a configuration of the system of FIG. 1.

FIG. 2 illustrates an exemplary embodiment of the system 100 in a run mode of operation. In this regard, in the run mode configuration, the contacts K3, K6, and K11 are opened and the contacts K1, K2, K4, K5, K7, K8, K9, and K10 are closed. The closed contacts K5 allow ac power from the main generator armature windings 112 to be rectified by the rectifier 114 into high voltage dc that supplies the dc bus 116. The closed contacts K7 and K8 and K9 and K10 allow the VFDs 132 to drive the traction motors 134. The voltage regulator 130 regulates power from the dc bus 116 to provide excitation for the exciter field winding 106. The bidirectional DC-DC converter 124 converts dc power from the dc bus 116 to charge the battery 118 and provide power to the dc load 120. The programmable export inverter 124 receives dc power from the dc bus 116 and inverts the dc power to output ac power (e.g., 60 Hz) to the 60 Hz load 128 via the output filter 126.

Figure 3:
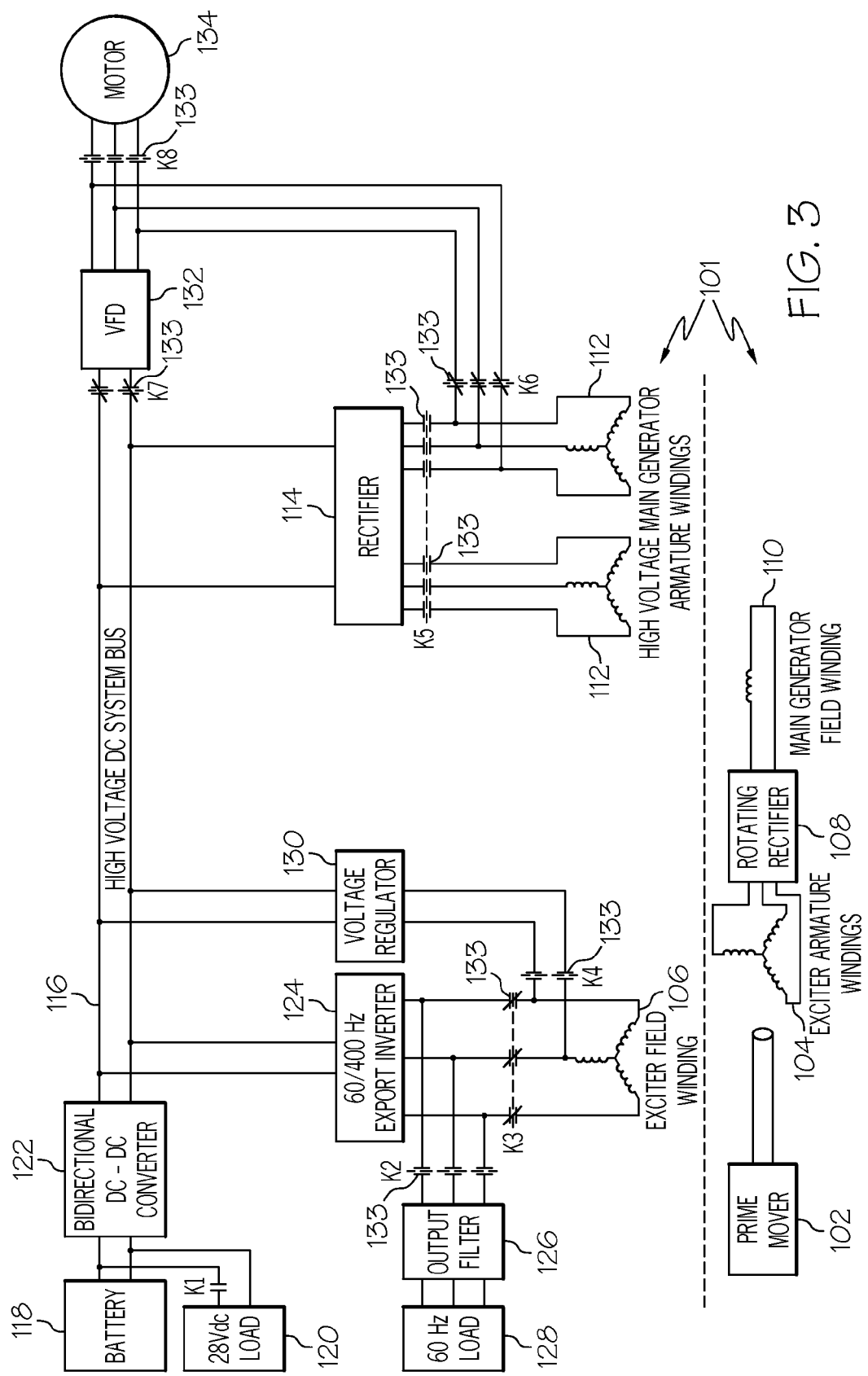
FIG. 3 illustrates a block diagram of an alternate exemplary embodiment of a system.

FIG. 3 illustrates an alternate exemplary embodiment of a system 300. The system 300 is similar to the system 100 described above however, the system 300 includes a single VFD 132 connected to the dc bus 116 and a respective motor 134. The starting modes and run modes of the system 300 are similar to the start and run mode configurations of the system 100 described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A power generation system comprising:
   a prime mover;
   a generator mechanically connected to the prime mover, the generator including a field winding portion and an armature winding portion;
   a direct current bus node;
   a first variable frequency drive having an input electrically connected to the bus node and an output electrically connected to the armature winding portion; and
   an inverter having an input electrically connected to the bus node and an output electrically connected to the field winding portion.

2. The system of claim 1, wherein the system further includes a first motor, the first variable frequency drive output is electrically connected to the motor.

3. The system of claim 1, wherein the system further includes a bidirectional direct current to direct current converter electrically connected to the bus node.

4. The system of claim 3, wherein the system further includes a battery electrically connected to the bidirectional direct current to direct current converter.

5. The system of claim 1, wherein the inverter is a programmable inverter operative to receive direct current from the bus node and output alternating current having a first frequency.

6. The system of claim 5, wherein the inverter is further operative to output alternate current having a second frequency.

7. The system of claim 5, wherein the inverter is operative to output the alternating current having the first frequency to the field winding portion during a starting operation mode.

8. The system of claim 6, wherein the inverter is operative to output the alternating current having the second frequency to an electrically connected lode during a run operation mode.

9. The system of claim 1, wherein the system further includes a rectifier having an input connected to the armature winding portion and an output connected to the bus node.

10. The system of claim 2, wherein the first variable frequency drive is operative to output alternating current to the armature winding portion during a starting operation mode and to output the alternating current to the first motor during a run operation mode.

11. The system of claim 1, wherein the armature winding portion includes a first set of three-phase armature windings and a second set of three-phase armature windings.

12. The system of claim 11, wherein the system further includes a second variable frequency drive, the output of the first variable frequency drive is electrically connected to the first set of three-phase armature windings and the output of the second variable frequency drive is electrically connected to the second set of three-phase armature windings.

13. The system of claim 12, wherein the system further includes a second motor, second variable frequency drive is operative to output alternating current to the second set of three-phase armature windings during a starting operation mode and to output the alternating current to the second motor during a run operation mode.

14. A method for starting a generator system, the method comprising:
   outputting direct current from a direct current source to an inverter;
   inverting the direct current in to alternating current and outputting the alternating current to a field winding portion of a generator;
   outputting direct current from the direct current source to a variable frequency driver;
   inverting the direct current in to alternating current and outputting the alternating current from the variable frequency driver to an armature winding portion of the generator;
   rotating the generator to drive a prime mover, the prime mover mechanically connected to the generator; and
   starting the prime mover.

15. The method of claim 14, wherein the method further includes ceasing the output of alternating current from the variable frequency driver to the armature winding portion of the generator responsive to starting the prime mover.

16. The method of claim 15, wherein the method includes outputting alternating current from the armature winding portion of the generator to a rectifier portion in response to ceasing the output of alternating current from the variable frequency driver to the armature winding portion of the generator.

17. The method of claim 14, wherein the alternating current output to the field winding portion of the generator has a first frequency.

18. The method of claim 17, wherein the method includes outputting alternating current from the variable frequency driver to a motor in response to ceasing the output of alternating current from the variable frequency driver to the armature winding portion of the generator.

19. The method of claim 17, wherein the method includes:
ceasing the output of the alternating current output to the field winding portion of the generator responsive to starting the prime mover; and
outputting direct current to the field winding portion.

20. The method of claim 19, wherein the method includes outputting alternating current at a second frequency to a load responsive to ceasing the output of the alternating current output to the field winding portion of the generator.

\* \* \* \* \*